(12) United States Patent
Benjebbour et al.

(10) Patent No.: US 10,098,073 B2
(45) Date of Patent: Oct. 9, 2018

(54) RADIO BASE STATION, USER TERMINAL, RADIO COMMUNICATION METHOD AND RADIO COMMUNICATION SYSTEM

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 20 days.

(21) Appl. No.: 15/111,842

(22) PCT Filed: Dec. 15, 2014

(86) PCT No.: PCT/JP2014/083072
§ 371 (c)(1),
(2) Date: Jul. 15, 2016

(87) PCT Pub. No.: WO2015/107818
PCT Pub. Date: Jul. 23, 2015

(65) Prior Publication Data
US 2016/0330695 A1 Nov. 10, 2016

(30) Foreign Application Priority Data

Jan. 17, 2014 (JP) ................................. 2014-006441

(51) Int. Cl.
*H04W 4/00* (2018.01)
*H04W 52/26* (2009.01)
(Continued)

(52) U.S. Cl.
CPC ......... *H04W 52/262* (2013.01); *H04L 1/0003* (2013.01); *H04L 1/1812* (2013.01);
(Continued)

(58) Field of Classification Search
None
See application file for complete search history.

(56) References Cited

U.S. PATENT DOCUMENTS

2006/0008020 A1* 1/2006 Blankenship ......... H04L 1/0003
375/261
2008/0137577 A1* 6/2008 Habetha ................ H04W 28/22
370/311

(Continued)

OTHER PUBLICATIONS

International Search Report issued in corresponding application No. PCT/JP2014/083072 dated Feb. 24, 2015 (2 pages).
(Continued)

*Primary Examiner* — Jutai Kao
(74) *Attorney, Agent, or Firm* — Osha Liang LLP

(57) ABSTRACT

A radio base station applies non-orthogonal multiple access to a plurality of user terminals and transmits downlink signals, and this radio base station has a scheduling section that selects a user set to apply non-orthogonal multiple access to from candidate user sets, and selects a combination of a modulation and coding scheme and transmission power based on combinations of candidate transmission power. The radio base station includes a control section that decides whether or not the combination of the modulation and coding scheme and transmission power selected in the scheduling section is included in combinations that are stipulated in advance, and controls the scheduling section in accordance with the decision. A transmission section applies the combination of the modulation and coding scheme and transmission power to user terminals that are included in the user set selected in the scheduling section, and transmits the downlink signals.

10 Claims, 11 Drawing Sheets

(51) Int. Cl.
H04W 52/28 (2009.01)
H04L 1/18 (2006.01)
H04L 1/00 (2006.01)
H04W 72/04 (2009.01)
H04W 72/12 (2009.01)

(52) U.S. Cl.
CPC ......... *H04W 52/28* (2013.01); *H04W 72/042* (2013.01); *H04W 72/0473* (2013.01); *H04W 72/121* (2013.01)

(56) References Cited

U.S. PATENT DOCUMENTS

| | | | | |
|---|---|---|---|---|
| 2015/0003268 A1* | 1/2015 | Wang | .................... | H04W 72/08 370/252 |
| 2015/0078279 A1* | 3/2015 | Ko | ........................ | H04L 1/1861 370/329 |
| 2016/0143017 A1* | 5/2016 | Yang | .................... | H04W 4/005 370/329 |

OTHER PUBLICATIONS

Written Opinion of the International Searching Authority issued in corresponding application No. PCT/JP2014/083072 dated Feb. 24, 2015 (3 pages).
3GPP TR 25.913 V9.0.0, "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).

* cited by examiner

| SET | REPORTING BITS | UE1 MCSP SET | UE2 MCSP SET |
|---|---|---|---|
| SET1 | 000 | MCS1, P | – |
| SET2 | 001 | MCS2, P | – |
| SET3 | 010 | MCS3, P | – |
| SET4 | 011 | MCS1, P1 | MCS2, P – P1 |
| SET5 | 100 | MCS1, P2 | MCS2, P – P2 |
| SET6 | 101 | MCS3, P3 | MCS5, P – P3 |
| SET7 | 110 | MCS2, P4 | MCS4, P – P4 |
| SET8 | 111 | MCS1, P2 | MCS5, P – P2 |

FIG. 5

| SET | REPORTING BITS | UE1 MCSP SET | UE2 MCSP SET |
|---|---|---|---|
| SET1 | 00 | MCS1, P | – |
| SET2 | 01 | MCS2, P | – |
| SET3 | 10 | MCS3, P | – |
| SET4 | 11 | MCS1, P1 | MCS2, P – P1 |

FIG. 6A

| SET | REPORTING BITS | UE1 MCSP SET | UE2 MCSP SET |
|---|---|---|---|
| SET1 | 00 | MCS1, P | – |
| SET2 | 01 | MCS2, P | – |
| SET3 | 10 | MCS3, P | – |
| SET4 | 11 | MCS1, P2 | MCS2, P – P2 |

FIG. 6B

RADIO BASE STATION, USER TERMINAL, RADIO COMMUNICATION METHOD AND RADIO COMMUNICATION SYSTEM

TECHNICAL FIELD

The present invention relates to a radio base station, a user terminal, a radio communication method and a radio communication system in a next-generation mobile communication system.

BACKGROUND ART

Conventionally, various radio communication schemes are used in radio communication systems. For example, in UMTS (Universal Mobile Telecommunications System), which is also referred to as "W-CDMA (Wideband Code Division Multiple Access)," code division multiple access (CDMA) is used. Also, in LTE (Long Term Evolution), orthogonal frequency division multiple access (OFDMA) is used (see, for example, non-patent literature 1).

CITATION LIST

Non-Patent Literature

Non-Patent Literature 1: 3GPP TR 25.913 "Requirements for Evolved UTRA (E-UTRA) and Evolved UTRAN (E-UTRAN)"

SUMMARY OF INVENTION

Technical Problem

Now, as shown in FIG. 1, the radio communication scheme called "FRA" (Future Radio Access) and so on is under study as a successor of W-CDMA and LTE. In FRA, in addition to OFDMA, the use of non-orthogonal multiple access (NOMA), which is premised upon canceling interference (interference cancellation) on the receiving end, as a downlink radio resource allocation scheme, is anticipated.

In FRA, downlink signals for a plurality of user terminals are superposed over the same radio resource allocated by OFDMA, and transmitted with different transmission power depending on each user terminal's channel gain. A user terminal on the receiving end can separate signals for other user terminals and extract the signals for the subject terminal by processing downlink signals in a signal separation method such as successive interference cancellation (SIC).

Also, as for link adaptation in each radio communication scheme, W-CDMA uses transmission power control (fast TPC), and LTE uses adaptive modulation and coding (AMC) to adjust the modulation scheme and coding rate adaptively. In FRA, the use of transmission power allocation and adaptive modulation and coding for multiple users (MUPA: Multi-User Power Allocation/AMC) is under study.

When NOMA is used, how link adaptation is provided (for example, by controlling the modulation and coding scheme (MCS), by way of adaptive transmission power control and so on) needs to be reported to user terminals. However, when the number of user terminals to be non-orthogonal-multiplexed over the same radio resource increases, the communication overhead of information that is required for adaptive control increases, and therefore the throughput decreases. Consequently, the method to realize non-orthogonal multiplexing while reducing the decrease of throughput is in demand.

The present invention has been made in view of the above, and it is therefore an object of the present invention to provide a radio base station, a user terminal, a radio communication method and a radio communication system that can realize non-orthogonal multiple access while reducing the decrease of throughput.

Solution to Problem

A radio base station according to one embodiment of the present invention provides a radio base station that applies non-orthogonal multiple access to a plurality of user terminals and transmits downlink signals, and this radio base station has a scheduling section that selects a user set to apply non-orthogonal multiple access to from candidate user sets, and selects a combination of a modulation and coding scheme and transmission power based on combinations of candidate transmission power, a control section that decides whether or not the combination of the modulation and coding scheme and transmission power selected in the scheduling section is included in combinations that are stipulated in advance, and controls the scheduling section in accordance with the decision, and a transmission section that applies the combination of the modulation and coding scheme and transmission power, selected in the scheduling section, to user terminals that are included in the user set selected in the scheduling section, and transmits the downlink signals.

Advantageous Effects of Invention

According to the present invention, it is possible to realize non-orthogonal multiple access while reducing the decrease of throughput.

BRIEF DESCRIPTION OF DRAWINGS

FIG. 5 is a diagram to show examples of MCSP sets that are stipulated in advance, according to the present embodiment;

FIG. 6 provide diagrams to show examples of changing an MCSP table according to the present embodiment;

DESCRIPTION OF EMBODIMENTS

Figure 1:
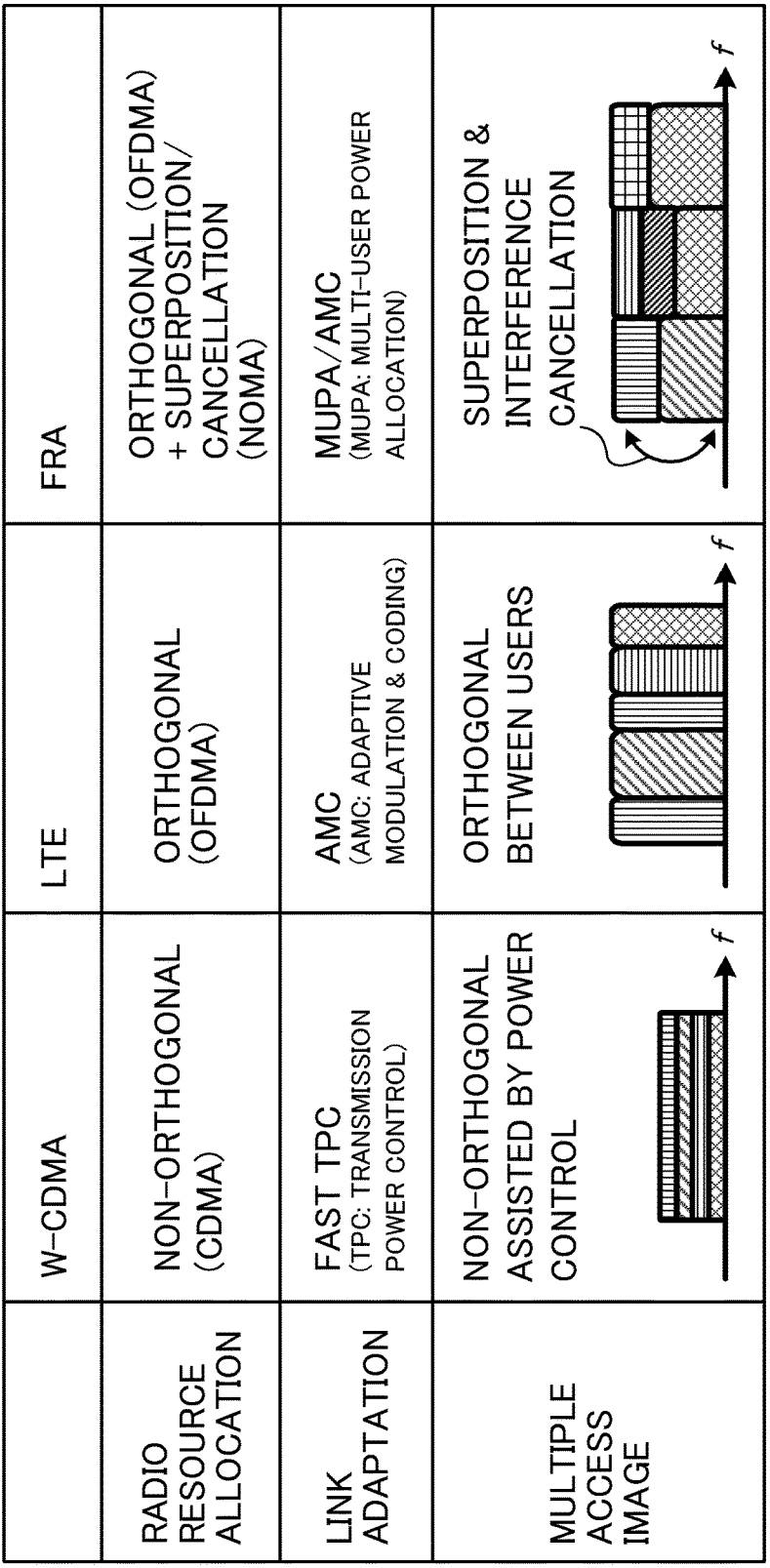
FIG. 1 is a diagram to explain radio access schemes for use in various radio communication systems.
Figure 2:
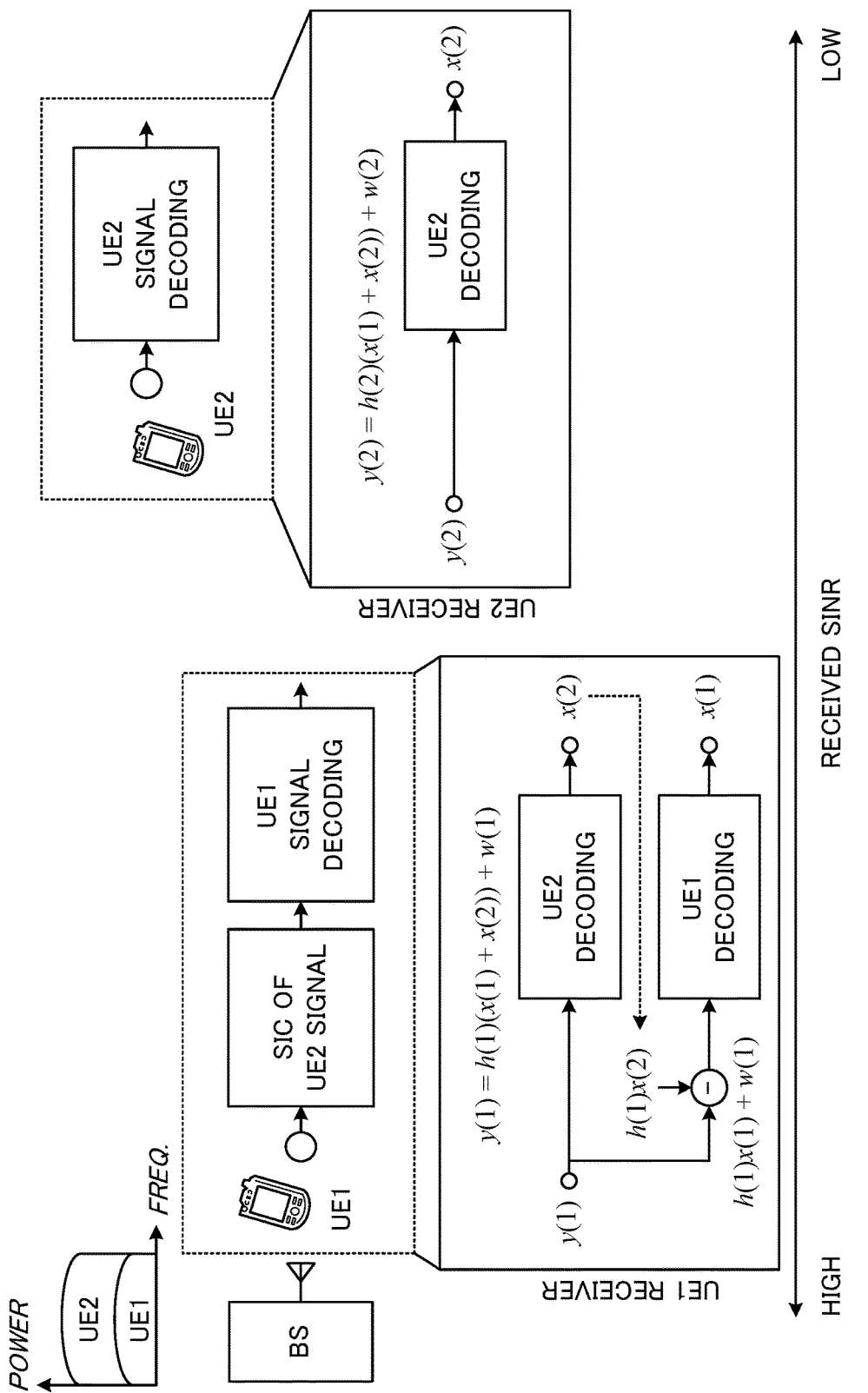
FIG. 2 is a diagram to explain NOMA (Non-Orthogonal Multiple Access) and SIC (Successive Interference Cancellation) on the downlink.

FIG. 2 is a diagram to explain NOMA and SIC on the downlink. FIG. 2 shows a case where, in the coverage area of a radio base station BS, a user terminal UE 1 is located near the radio base station BS and a user terminal UE 2 is located far from the radio base station BS. The path loss of downlink signals from the radio base station BS to each user terminal UE increases with the distance from the radio base station BS. Consequently, the received SINR at the user terminal UE 2 that is located far from the radio base station BS becomes lower than the received SINR at the user terminal UE 1 that is located near the radio base station BS.

In NOMA, a plurality of user terminals UE are non-orthogonal-multiplexed over the same radio resource by changing transmission power depending on channel gain (for example, the received SINR, the RSRP (Reference Signal Received Power). etc.), path loss and so on. For example, referring to FIG. 2, downlink signals for the user terminals UE 1 and UE 2 are multiplexed over the same radio resource with different transmission power. Also, the downlink signal for the user terminal UE 1 where the received SINR is higher is allocated relatively small transmission power, and the downlink signal for the user terminal UE where the received SINR is lower is allocated relatively large transmission power.

Also, in NOMA, downlink signals for a subject terminal are extracted by cancelling interference signals from received signals by means of SIC, which implements a successive interference canceller-based signal separation method. For downlink signals directed to the subject terminal, downlink signals for other terminals that are non-orthogonal-multiplexed in the same radio resource with greater transmission power than that of the subject terminal become interference signals. Consequently, downlink signals for the subject terminal are extracted by cancelling downlink signals for other terminals with greater transmission power than that of the subject terminal from received signals.

For example, referring to FIG. 2, the received SINR of the user terminal UE 2 is lower than the received SINR of the user terminal UE 1, and therefore the downlink signal for the user terminal UE 2 is transmitted with greater transmission power than that of the downlink signal for the user terminal UE 1. Consequently, the user terminal UE 1 located near the radio base station BS not only receives the downlink signal for the subject terminal, but also receives the downlink signal for the user terminal UE 2, which is non-orthogonal-multiplexed over the same radio resource, as an interference signal. The user terminal UE 1 extracts and adequately decodes the downlink signal for the subject terminal by canceling the downlink signal for the user terminal UE 2 by means of SIC.

Meanwhile, the received SINR at the user terminal UE 1 is higher than the received SINR at the user terminal UE 2, so that the downlink signal for the user terminal UE 1 is transmitted with smaller transmission power than that of the downlink signal for the user terminal UE 2. Consequently, the user terminal UE 2 located far from the radio base station BS can ignore the interference by the downlink signal for the user terminal UE 1 that is non-orthogonal-multiplexed over the same radio resource, and therefore can extract and adequately decode the downlink signal for the subject terminal, without canceling interference by means of SIC.

In this way, when NOMA is employed on the downlink, a plurality of user terminals UE 1 and UE 2 with varying channel gains can be multiplexed over the same radio resource, so that improved spectral efficiency can be achieved.

Now, transmission process in NOMA will be described. FIG. 5 is a flowchart to explain transmission process in NOMA. First, each user terminal (UE) receives a reference signal from a radio base station (BS), and estimates the channel gain based on this reference signal. Then, each user terminal feeds back the channel gain to the radio base station (step ST01). Note that, for the reference signal, the CSI-RS (Channel State Information Reference Signal), the DM-RS (DeModulation Reference Signal), the CRS (Cell-Specific Reference Signal) and/or the like may be used.

Next, for each subband, the radio base station selects one candidate user set from among all the user terminals belonging in the coverage area (step S02). A candidate user set refers to a combination of candidate user terminals to be non-orthogonal-multiplexed over a subband. Here, a subband refers to a frequency band that is formed with a predetermined number of radio resources (for example, resource blocks (RBs) and so on) that are consecutive in the frequency direction. Also, the number of radio resources (for example, the number of RBs) to constitute each subband (subband size) and/or the number of subbands to constitute the system band (wide band) can be changed depending on the size of the system band allocated to the user terminals.

The total number of subband-specific candidate user sets is represented by following equation 1, where M is the total number of user terminals that belong to the coverage area, and N is the number of user terminals that are non-orthogonal-multiplexed. Note that the following calculation process sequence (steps ST03 to ST06) is carried out for all of the candidate user sets (exhaustive search).

$$\binom{M}{N} \qquad \text{(Equation 1)}$$

Next, the radio base station calculates the transmission power of a subband to allocate to each user terminal in the candidate user set based on the channel gains fed back from each user terminal (step ST03). Next, the radio base station calculates the SINR of the subband (the SINR for scheduling) in each user terminal, anticipated under the application of non-orthogonal-multiplexing, based on the transmission powers that is calculated (step ST04). Next, the radio base station determines the block error rate (BLER) of the MCS (Modulation and Coding Scheme) set from the SINRs calculated, and calculates the throughput of the subband for scheduling in each user terminal (step ST05).

Next, from each user terminal's instantaneous throughput and average throughput, the radio base station calculates the scheduling metric of the candidate user set (step ST06). For the scheduling metric, for example, the PF (Proportional Fairness) scheduling metric may be calculated. The PF scheduling metric $M_{sj,b}$ is represented by following equation 2, where $T_k$ is the average throughput and $R_{k,b}$ is the instantaneous throughput. Note that the PF scheduling metric $M_{sj,b}$ represents the PF scheduling metric of the j-th candidate user set in the b-th subband. Also, k denotes the k-th user terminal in the candidate user set.

$$M_{S_j,b} = \sum_{k \in S_j} \frac{R_{k,b}(t)}{T_k(t)} \qquad \text{(Equation 2)}$$

The radio base station carries out steps ST03 to ST06 for every candidate user set, and selects the user set to maximize the scheduling metric in each subband (step ST07). Then, the radio base station performs steps ST02 to ST07 for every subband, and selects the user set to maximize the scheduling metric in each subband. Also, for the each user set that is selected, the radio base station calculates the average SINR of the allocated subband, and selects the MCS for each user terminal per subband. Note that it is equally possible to select an MCS that applies to all subbands in common. It is also possible to select user sets based on other scheduling metrics.

Next, the radio base station allocates the downlink signals for the user terminals constituting the user set to the same subband, and non-orthogonal-multiplexes and transmits the downlink signals to each user terminal by applying different transmission power per subband (step ST08). Also, the radio base station reports information to represent the transmission power and/or the MCS, determined per subband, to each user terminal, dynamically or semi-statically. This information, when reported dynamically, may be reported, for example, as downlink control information (DCI: Downlink Control Information), through a downlink control channel (PDCCH (Physical Downlink Control CHannel) or EPDCCH (Enhanced PDCCH)). Also, this information, when reported semi-statically, may be reported through higher layer signaling such as RRC (Radio Resource Control) layer and MAC (Medium Access Control) layer signaling.

Next, each user terminal that is selected by the radio base station as being in a user set not only receives the downlink signal for the subject terminal, but also receives downlink signals for other terminals that are non-orthogonal-multiplexed over the same radio resource (step ST09). Then, each user terminal cancels the downlink signals for other terminals having lower channel gain and greater transmission power than the subject terminal's downlink signal, by means of SIC, and extracts (separates) the signal for the subject terminal. In this case, the downlink signals for other terminals with higher channel gain and lower transmission power than the subject terminal's downlink signal are simply left as interference signals, without being cancelled, and the signals for the subject terminal is decoded.

Now, in the above-described NOMA transmission process, a method of determining the transmission power to allocate to each user terminal on a per subband basis is under study. FTPA (Fractional Transmission Power Allocation) is a method of determining transmission power, uniquely, based on the magnitude of each user terminal's channel gain per subband. Note that FTPA may be referred to as FTPC (Fractional Transmission Power Control), or may be represented using different names.

For example, the number of user terminals to be allocated to the same radio resource is K and the number of subband is n, in FTPA, the transmission power of each user terminal allocated to the same radio resource is determined based on following equation 3:

$$P_{k,b} = \frac{P_b}{\sum_{i=1}^{K} (|h_{i,b}|^2 / N_{i,b})^{-\alpha}} \left( \frac{|h_{k,b}|^2}{N_{k,b}} \right)^{-\alpha} \quad \text{(Equation 3)}$$

Here, $P_{k,b}$ is the transmission power of the k-th user terminal ($1 \leq k \leq K$) in the b-th subband. $P_b$ is the total transmission power in the b-th subband ($1 \leq b \leq n$). $h_{k,b}$ is the channel coefficient of the k-th user terminal in the b-th subband. $N_{k,b}$ is the sum of interference and noise from other cells in the k-th user terminal in the b-th subband. Also, $\alpha$ ($0 \leq \alpha \leq 1$) is a parameter to control system efficiency and fairness. Note that, when $\alpha=0$ holds, user terminals to be non-orthogonal-multiplexed have equal transmission power, and, when $\alpha \to 1$ holds, user terminals with lower channel gain are allocated greater transmission power.

Note that, in equation 3, $$\left( \frac{|h_{k,b}|^2}{N_{k,b}} \right)$$

represents the channel gain of the k-th user terminal in the b-th subband.

Given a combination of user terminals to which NOMA is applied, FSPA (Full Search Power Allocation) is a scheme to perform an exhaustive search of a plurality of combinations of transmission power (transmission power sets) based on the magnitude of each user terminal's channel gain per subband. In FSPA, based on a transmission power set that is determined based on the search, the transmission power of each user terminal allocated to the same radio resource is determined. Here, the components of the transmission power set may be each user terminal's transmission power value, or each user terminal's transmission power ratio with respect to the total transmission power. Note that FSPA may also be represented using other names.

Although FTPA and FSPA have an advantage of allowing NOMA to provide flexible gain, information pertaining to the MCS and transmission power need to be reported to each user terminal, and therefore there is a problem that the amount of information to report and the amount of calculation pertaining to scheduling are relatively large. Also, since the candidate sets are structured to include combinations of an MCS and transmission powers that improve the quality of transmission signals (for example, increase the EVM (Error Vector Magnitude)), the robustness of transmission signals against quality deterioration, which relies on the combination of the MCS and transmission power, decreases.

Here, from the perspective of reducing the amount of information to report, it may be possible to joint-encode the MCS and transmission power that are determined, rather than reporting these individually. However, even when joint encoding is employed, if the number of user terminals to non-orthogonal-multiplex over the same radio resource increases, the number of combinations of an MCS and transmission power also increases, inevitably. Consequently, there is a threat of a decrease of throughput because the information that is then required in adaptive control entails increased communication overhead.

As made clear above, there is a problem with the conventional method of determining transmission power based on NOMA transmission process that the amount of information that needs to be reported to user terminals cannot be successfully reduced without damaging the gain that can be achieved by NOMA.

So, the present inventors have studied the relationship between the MCS and transmission power, and allocation of NOMA, and found out that radio resources are more likely to be allocated to cell-center user terminals when the MCS is larger, and to cell-edge user terminals when the MCS is smaller. The present inventors have also found out that, in the event of NOMA multiplexing, the distribution of power is less if user terminals are located nearer the center of the cell and the distribution of power is greater when user terminals are located nearer cell edges. Here, when the MCS is "large," this means that the ideal communication throughput value that can be achieved with this MCS is large. In other words, when the MCS is large, this also means that the value of the MCS index, defined in LTE systems and/or others, is large. Hereinafter, a combination of a modulation scheme and a coding rate, with transmission power, will be referred to as an "MCSP (MCS and Power) set." Note that an MCSP set may be represented using other names as well.

So, the present inventors have arrived at the present invention based on these discoveries. To be more specific, in view of the above background, the present inventors have come up with the idea of limiting the candidates of MCSP sets which the scheduler can select out of all MCSP sets—that is, the candidates of MCSP sets that can be reported to user terminals. By this means, it is possible to reduce the amount of information to be report to user terminals without damaging the gain of NOMA.

Now, the radio communication method according an embodiment of the present invention (hereinafter "the present embodiment") will be described below in detail. According to the present embodiment, when scheduling is carried out based on channel gains that are fed back from user terminals, and, as a result, of this, an MCSP set that is selected is included among MCSP sets that are stipulated in advance, the scheduling is allowed to continue on an as-is basis. On the other hand, when an MCSP set that is selected is not included among MCSP sets that are stipulated in advance, this MCSP set is dropped, and the set to maximize the scheduling metric is determined again.

Assume that, with the present embodiment, FSPA is used as a scheme for determining the transmission power to allocate to each user terminal on a per subband basis, and a transmission power set is selected from a plurality of combinations of candidate transmission power (candidate transmission power sets). However, the method of determining transmission power is by no means limited to this.

Figure 3:
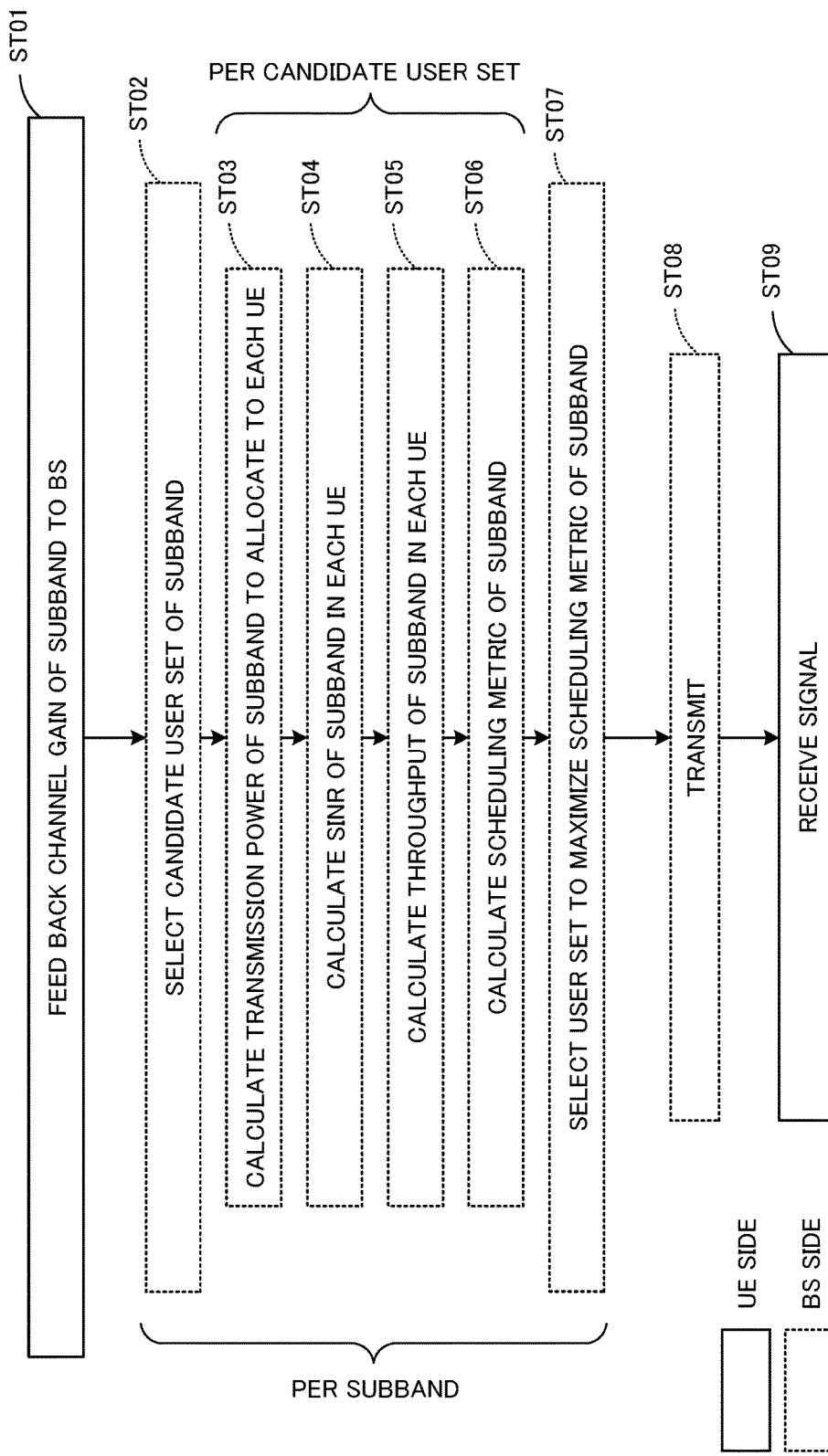
FIG. 3 is a diagram to show a flowchart of transmission process in NOMA.
Figure 4:
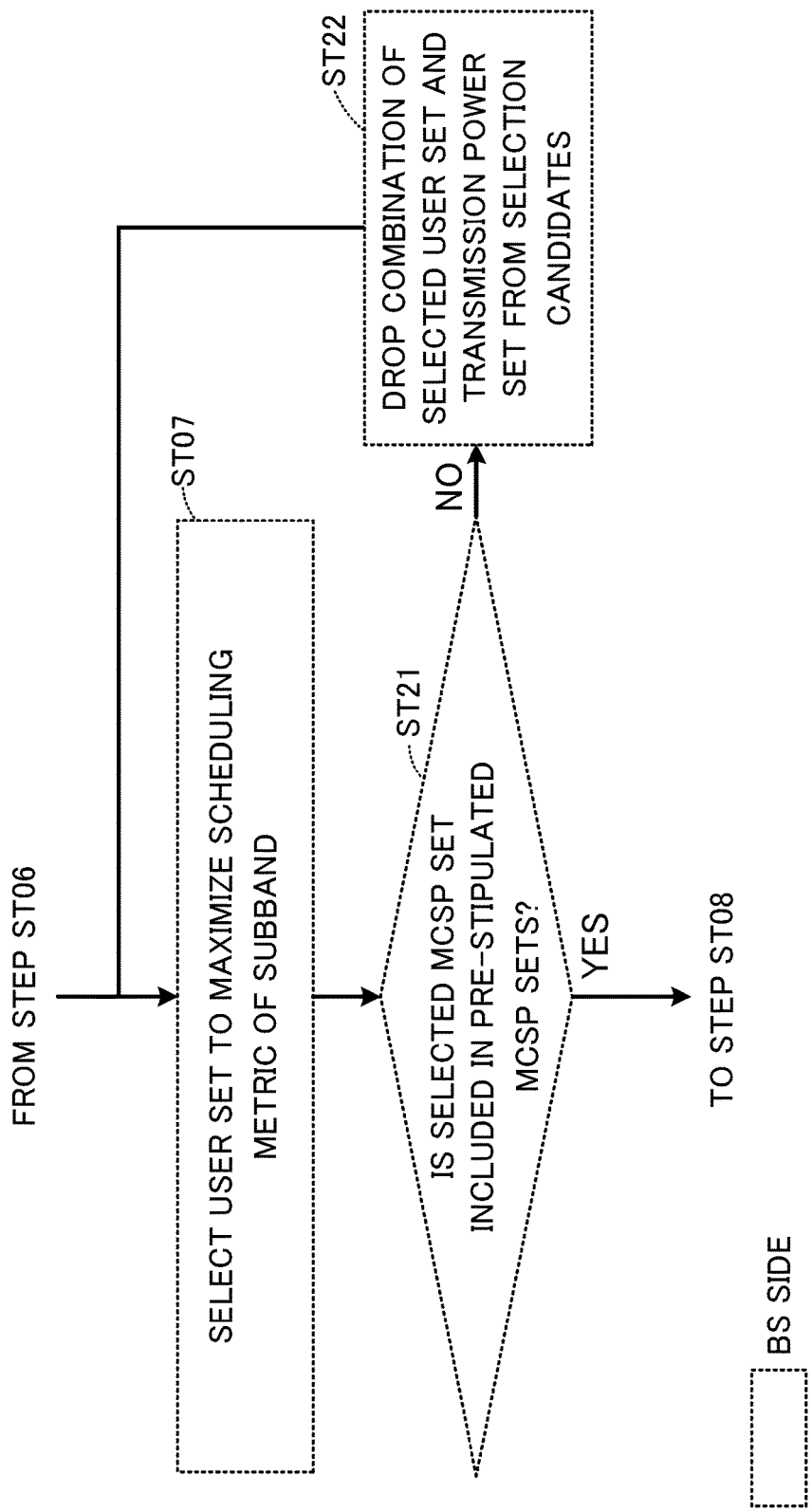
FIG. 4 is a diagram to show a flowchart of transmission process in NOMA according to the present embodiment.

FIG. 4 is a flowchart to show the operation according to the present embodiment. Steps ST01 to ST09 are the same as those of FIG. 3, and therefore will not be described again.

A radio base station selects a predetermined user set in step ST07, and selects the MCSP set for this user set. In step ST21, whether the MCSP set that is selected in step ST07 is included in combinations that are stipulated in advance (MCSP sets that are stipulated in advance) is decided. When the MCSP set is included in the pre-stipulated MCSP sets (step ST21: YES), the step moves on to step ST08, and data transmission is carried out based on the determined MCSP set.

On the other hand, when the MCSP set is not included in the pre-stipulated MCSP sets (step ST21: NO), the combination of the selected user set and transmission power set is dropped from the candidates for selection (step ST22), and the step returns to step ST07 again. For example, it is possible to store candidate transmission power sets on a per candidate user set basis, and perform the process so that a candidate transmission power set that is selected for a predetermined candidate user set that is selected will not be selected afterward. By this means, it is possible to select an MCSP set that makes the scheduling metric as large as possible, from among MCSP sets that are stipulated in advance. Note that a structure to skip part or the whole of the dropping process depending on predetermined conditions (for example, depending on whether a predetermined period of time is over) may be employed. Also, a structure may be employed here in which, when scheduling is executed, part or the whole of the dropping process is skipped every time.

Examples of MCSP sets that are stipulated in advance will be described below. The radio base station can carry out allocation to user terminals by using MCSP sets that are stipulated in advance, and report information related to these MCSP sets to the user terminals. Here, based on NOMA multiplexing, a case to limit the MCSP sets will be assumed.

Note that, for the MCS and transmission power values to be candidates for selection, five values are stipulated for each. For example, if MCS1 to MCS5 are provided as candidate MCS values, MCS1 represents (64QAM, ¾), MCS2 represents (64QAM, ½), MCS3 represents (16QAM, ¾), MCS4 represents (16QAM, ½) and MCS5 represents (QPSK, ¾). Among these, MCS1 represents the maximum MCS, and MCS5 represents the minimum MCS. Also, the candidate transmission power values are P (the total power value that can be allocated), P1 (=0.2P), P2 (=0.3P), P3 (=0.4P), and P4 (=0.5P). Note that the differences of the above values may be used as transmission power. However, the candidate MCS and power values are by no means limited to these.

FIG. 5 is a diagram to show examples of MCSP sets that are stipulated in advance, according to the present embodiment. FIG. 5 shows set 1 to set 8 as MCSP sets, and also shows bits that are reported to user terminals and that represent each set, and MCSP sets that can be applied to two user terminals (UE1 and UE2) constituting a user set.

In FIG. 5, the reporting bits of the MCSP sets are joint-encoded. This joint encoding may be executed on a per subband basis, or may be carried out for all subbands together. Note that, with the MCSP sets that are stipulated in advance in FIG. 5, the reporting bits are three bits and stipulate eight MCSP sets, but this structure is by no means limiting. For example, the number of sets to stipulate and the length of the reporting bits may be increased or decreased, or parameters other than MCSP sets may be linked as well.

In set 1 to set 3, transmission power is allocated to one user terminal, which matches OMA. For example, set 1 represents an OMA allocation, in which, for UE1, the MCS is MCS1 and the transmission power is P. Note that, when NOMA alone is applied—that is, when there is no dynamic switching of NOMA/OMA—sets to represent OMA, such as those represented as set 1 to set 3, need not be configured.

Also, in set 4 to set 8, transmission power is allocated to tow user terminals, which matches NOMA. For example, set 4 represents a NOMA allocation, in which the MCS of UE1 is MCS1 and the transmission power is P1, and in which the MCS of UE2 is MCS2 and the transmission power is (P–P1).

Note that the MCSP sets that are stipulated in advance in FIG. 5 are structured so that all the user terminals (UE1 and UE2) are joint-encoded together, but this structure is by no means limiting. For example, it is possible to maintain the relationship in which the MCSP sets are joint-encoded on a per user terminal basis, and report different pieces of information representing each user terminal's MCSP set, instead of the reporting bits shown in FIG. 5.

Also, it is possible to structure the MCSP set correspondence table (MCSP table) of FIG. 5 to change semi-statically, instead of being permanently fixed. FIG. 6 shows examples of changing the MCSP table according to the present embodiment. FIG. 6A shows the MCSP table at time 1. Also, FIG. 6B shows the MCSP table at time 2, which is different from time 1. According to the present embodiment, as shown in FIG. 6A and FIG. 6B, it is possible to change the MCSP table semi-statically, or in a long cycle, and report information related to the MCSP table to user terminals by using higher layer signaling (for example, RRC signaling, broadcast signals and so on). On the other hand, an MCSP set that is selected by the scheduler is reported to a predetermined user terminal or a user set by using the PDCCH on a dynamic basis or in a short cycle.

Like set 4 in FIG. 6, when semi-static updating suffices for predetermined parameters that are included in MCSP sets (for example, when the possibility to use P1 is low), it is possible to reduce the number of sets in the MCSP table by updating the MCSP table semi-static ally. By this means, it is possible to reduce the amount of MCSP set-related information that needs to be reported to UEs significantly.

Also, what type of terminals the user terminals shown in the MCSP sets are may be linked as well. For example, MCSP sets may be stipulated in advance on the assumption that UE1 is a terminal located in the cell center and UE2 is a terminal located on a cell edge.

Here, an example of the process of the flowchart of FIG. 4 will be described using the MCSP sets that are stipulated in advance in FIG. 5. In this example, in step ST07, user terminals UE1 and UE2 are selected as a user set, the MCSP set for UE1 is (MCS3, P2) and the MCSP set for UE2 is (MCS5, P–P2). The decision is rendered in step ST21 that the above MCSP sets are not included in the MCSP sets that are stipulated in advance (step ST21: NO).

Next, in step ST22, Form the candidate user sets and the candidate transmission power sets, the combinations in which the user set (UE1, UE2) and the transmission power set (P2, P–P2) are associated are dropped so as not to be selected. Back to step ST07 again, assume that user terminals UE1 and UE2 are selected as the user set, (MCS3, P3) is selects as the MCSP set for UE1, and (MCS5, P–P3) is selected as the MCSP set for UE2. These MCSP sets are decided to be included in the MCSP sets that are stipulated in advance (step ST21: YES), so that the scheduling becomes valid, and data transmission is carries out.

The information related to MCSP sets can be reported from the radio base stations to the user terminals by using higher layer signaling (for example, RRC signaling, broadcast information, etc.).

Also, when a plurality of user terminals are multiplexed in an MCSP set, it is possible to reduce the amount of information pertaining to transmission power. For example, if two user terminals are multiplexed in an MCSP set, it suffices to report information related to transmission power only for one of the user terminals. For example, if the transmission powers for UE1 and UE2 are Px and Py, respectively, given the relationship Py=P–Px, only one of Px and Py has to be reported. When only one transmission power is reported for an MCSP set with two user terminals, the user terminals may determine the difference from the total transmission power P so that the other transmission power can be determined.

Note that the reporting bits to represent MCSP sets can be transmitted using, for example, signaling by means of PDCCH/EPDCCH control information (DCI), higher layer signaling (for example, RRC signaling) and so on. Signaling by means of DCI is easy to report on a per subband or user terminal basis, and therefore is suitable for transmitting reporting bits.

Note that, according to the present embodiment, each user terminal identifies which terminal in a user set the subject terminal is, based on the DM-RS port which the radio base station assigns to each user terminal. The DM-RS (DeModulation Reference Signal) is a reference signal that is inserted by the radio base station so as to enable user terminals to perform channel estimation, which is required to demodulate the PDSCH. In particular, in MIMO (Multi Input Multi Output) communication using multiple antennas, it may be possible to transmit the DM-RS using different DM-RS ports on a per user terminal basis. For example, when two of DM-RS port 1 and DM-RS port 2 are available for use as DM-RS ports, it may be possible to decide that UE1 is the terminal to use DM-RS port 1 and UE2 is the terminal to use DM-RS port 2

However, the method of identifying user terminals is not limited to the above-described one. For example, the radio base station may identify user terminal based on information that is reported through higher layer signaling (for example, RRC signaling). Furthermore, the radio base station may explicitly report, to each user terminal, which terminal in the SIC decoding process each user terminal is.

As described above, according to the radio communication method of the present embodiment, it is possible to limit the candidate MCSP sets which the scheduler can select, so that it is possible to reduce the amount of information to report to user terminals without damaging the gain of NOMA. Also, with the radio communication method of the present embodiment, an MCSP set that is selected by the scheduler is compared against MCSP sets that are stipulated in advance, and, if these MCSP sets do not match, it suffices to only drop the user set and the transmission power set that are selected, from the candidate user sets and the candidate transmission power sets, and execute scheduling again, so that it is possible to implement the radio communication method of the present embodiment without making significant changes to existing schedulers.

(Example Structure of Radio Communication System)

Now, an example of a radio communication system according to the present embodiment will be described in detail below. Note that the same components will be assigned the same codes, and overlapping description will be omitted.

Figure 7:
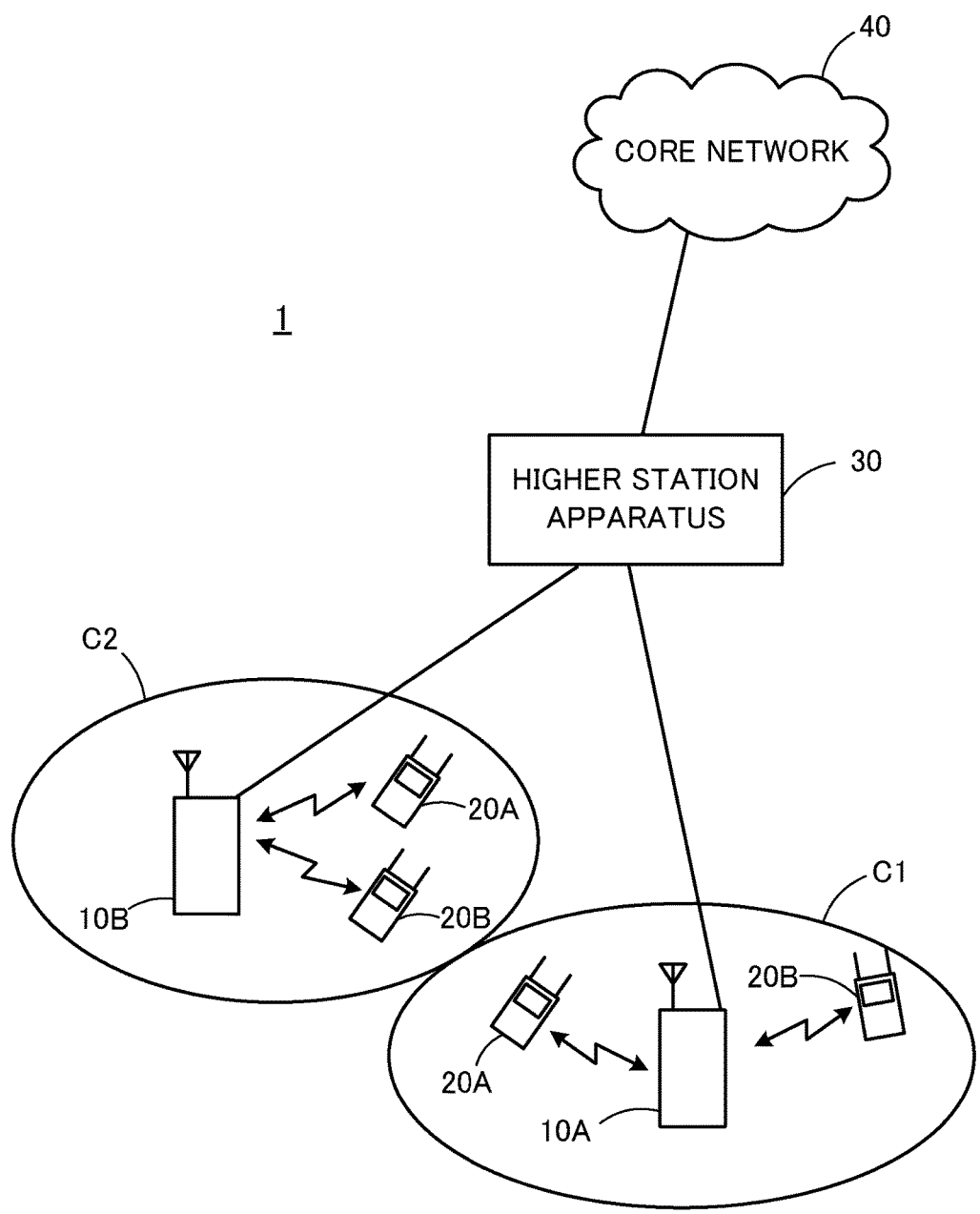
FIG. 7 is a diagram to show an example of a schematic structure of a radio communication system according to the present embodiment.

FIG. 7 is a schematic diagram to show an example structure of the radio communication system according to the present embodiment. Note that the radio communication system 1 shown in FIG. 7 is a system to accommodate, for example, the LTE system or the LTE-A (LTE-Advanced) system. This radio communication system may be referred to as "IT-advanced," or may be referred to as "MG" or "FRA (Future Radio Access)."

The radio communication system 1 shown in FIG. 7 includes radio base stations 10 (1A and B1B) and a plurality of user terminals 20 (20A and 20B) that communicate with these radio base stations 10. The radio base stations 10 are connected with a higher station apparatus 30, and this higher station apparatus 30 is connected with a core network 40. Each user terminal 20 can communicate with the radio base stations 10 in cells C1 and C2. Note that the higher station apparatus 30 may be, for example, an access gateway apparatus, a radio network controller (RNC), a mobility management entity (MME) and so on, but is by no means limited to these. Also, the radio base stations 10 may be connected by way of wire connection (optical fiber, X2 interface, etc.) or by wireless connection.

Note that the radio base stations 10 may be macro base stations or eNodeBs (eNBs) that form macro cells, or may be small base stations, micro base stations, pico base stations, femto base stations, home eNodeBs, RRHs (Remote Radio Heads) and so on that form small cells. Also, the radio base stations 10 may be referred to as "transmitting/receiving points" and so on. The user terminals 20 are terminals to support various communication schemes such as LTE, LTE-A and so on, and may be both mobile communication terminals and stationary communication terminals.

In the radio communication system 1, as radio access schemes, NOMA (Non-Orthogonal Multiple Access) is applied to the downlink, and SC-FDMA (Single Carrier Frequency Division Multiple Access) is applied to the uplink. Also, it is equally possible to apply OFDMA (Orthogonal Frequency Division Multiple Access) to the downlink.

NOMA is a multi-carrier communication scheme to divide a frequency band into a plurality of narrow frequency bands (subcarriers, subbands, etc.) and non-orthogonal-multiplex signals for user terminals 20 with different transmission power on a per subband basis, and OFDMA is a multi-carrier communication scheme to communicate by dividing a frequency band into a plurality of subbands and orthogonal-multiplexing signals for user terminals 20 on each subband. SC-FDMA is a single-carrier transmission scheme to mitigate interference between terminals by dividing the system band into bands formed with one or continuous resource blocks per user terminal, and allowing a plurality of user terminals 20 to use mutually different bands.

Now, communication channels to be used in the radio communication system 1 will be described. Downlink communication channels include a downlink shared data channel (PDSCH: Physical Downlink Shared CHannel), which is shared by each user terminal 20, downlink L1/L2 control channels (PDCCH, EPDCCH, PCFICH, PHICH, etc.), a broadcast channel (PBCH: Physical Broadcast CHannel) and so on. Downlink data and higher control information are communicated by the PDSCH. Scheduling information for the PDSCH and the PUSCH is communicated by the PDCCH (Physical Downlink Control CHannel) and the EPDCCH (Enhanced PDCCH). The number of OFDM symbols to use for the PDCCH is transmitted by the PCFICH (Physical Control Format Indicator CHannel). HARQ (Hybrid ARQ) delivery acknowledgement signals (for example, ACK, NACK, etc.) in response to the PUSCH are communicated by the PHICH (Physical Hybrid-ARQ Indicator CHannel).

Also, uplink communication channels include an uplink shared channel (PUSCH (Physical Uplink Shared CHannel)), which is shared by each user terminal 20, an uplink control channel (PUCCH (Physical Uplink Control CHannel)), a random access channel (PRACH (Physical Random Access CHannel)) and so on are used. Uplink data and higher control information are communicated by the PUSCH. Also, by the PUCCH or the PUSCH, downlink channel state information (CSI), ACKs/NACKs and so on are communicated.

Figure 8:
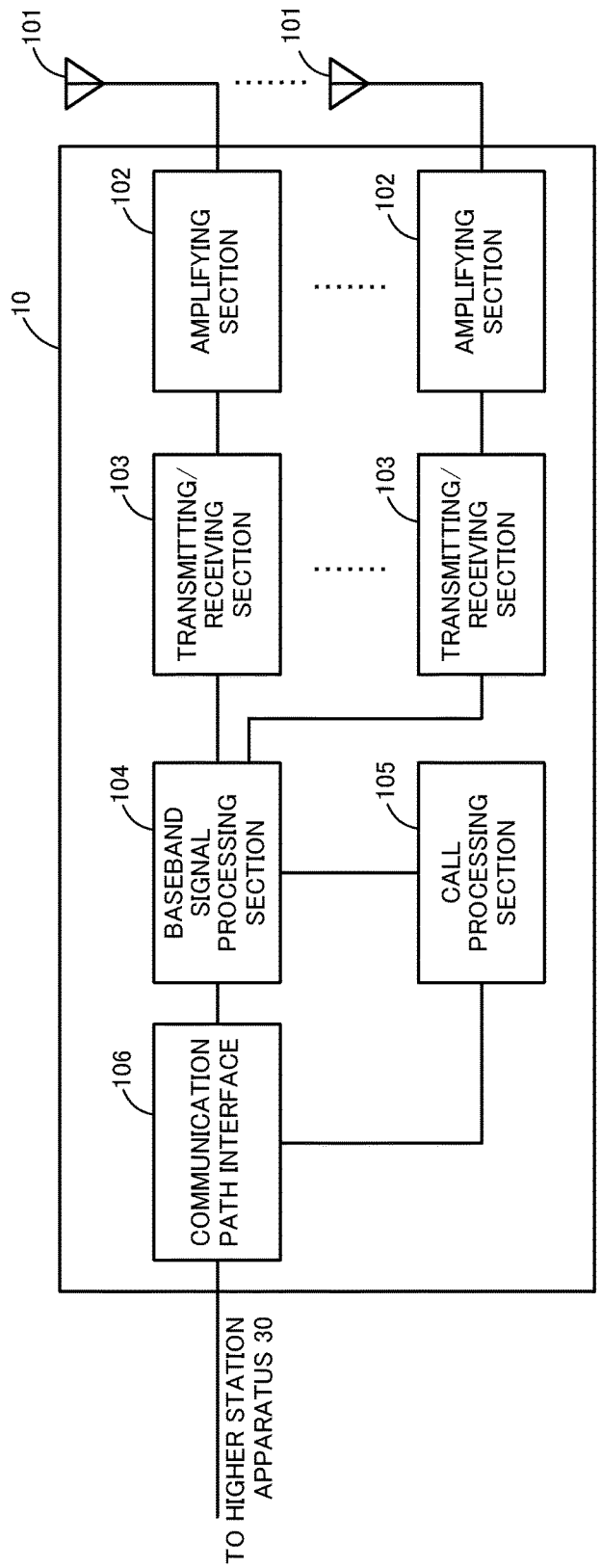
FIG. 8 is a block diagram to show an example of an overall structure of a radio base station according to the present embodiment.

FIG. 8 is a diagram to explain an overall structure of a radio base station according to the present embodiment. A radio base station 10 has transmitting/receiving antennas 101, amplifying sections 102, transmitting/receiving sections 103, a baseband signal processing section 104, a call processing section 105 and a communication path interface 106.

Downlink data that is transmitted from the radio base station 10 to a user terminal 20 on the downlink is input from the higher station apparatus 30 to the baseband signal processing section 104 via a communication path interface 106.

In the baseband signal processing section 104, the input downlink data is subjected to a PDCP (Packet Data Convergence Protocol) layer process, division and coupling of downlink data, RLC (Radio Link Control) layer transmission processes such as an RLC retransmission control transmission process, MAC (Medium Access Control) retransmission control (for example, an HARQ transmission process), scheduling, transport format selection, channel coding, an IFFT (Inverse Fast Fourier Transform) process and a pre-coding process, and the result is forwarded to each transmitting/receiving section 103. Also, downlink control data is subjected to transmission process including channel coding and an inverse fast Fourier transform, and forwarded to each transmitting/receiving section 103.

The transmitting/receiving sections 103 convert the baseband signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, data to be transmitted from the user terminal 20 to the radio base station 10 on the uplink is received in each transmitting/receiving antenna 101 and input in the amplifying sections 102. Radio frequency signals that are input from each transmitting/receiving antenna 101 are amplified in the amplifying sections 102 and sent to each transmitting/receiving section 103. The amplified radio frequency signals are subjected to frequency conversion in each transmitting/receiving section 103, and input in the baseband signal processing section 104.

In the baseband signal processing section 104, uplink data that is included in the baseband signals that are input is subjected to an inverse fast Fourier transform (IFFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

Figure 9:
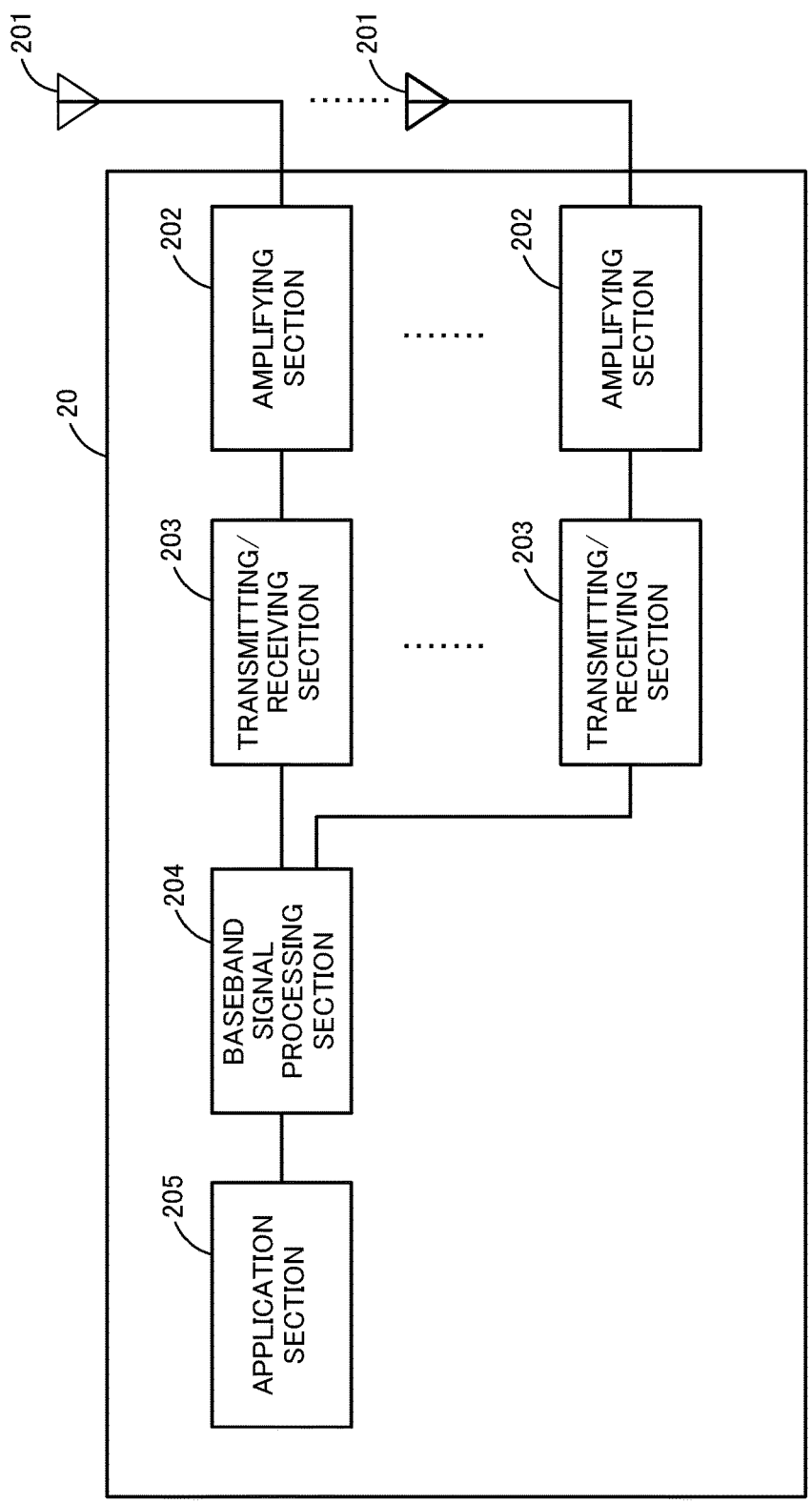
FIG. 9 is a block diagram to show an example of an overall structure of a user terminal according to the present embodiment.

FIG. 9 is a block diagram to show an example structure of a user terminal according to the present embodiment. A user terminal 20 has a plurality of transmitting/receiving antennas 201, amplifying sections 202, transmitting/receiving sections 203, a baseband signal processing section 204 and an application section 205.

Downlink signals are received in a plurality of transmitting/receiving antennas 201 and input in the amplifying sections 202. The radio frequency signals input from each transmitting/receiving antenna 201 are amplified in the amplifying sections 202 and sent to each transmitting/receiving section 203. The radio frequency signals are converted into baseband signals in each transmitting/receiving section 203, and input in the baseband signal processing section 204. The baseband signal processing section 204 applies receiving process such as an FFT process, error correction decoding, a retransmission control receiving process and so on, to the baseband signals. The downlink data that is included in the downlink signals is forwarded to the application section 205. The application section 205 performs processes related to higher layers above the physical layer and the MAC layer. Furthermore, in the downlink signals, broadcast information is also forwarded to the application section 205.

Meanwhile, uplink data signals are input from the application section 205 to the baseband signal processing section 204. The baseband signal processing section 204 applies retransmission control (for example, HARQ transmission process), channel coding, pre-coding, a DFT process, an IFFT process and so on to the input uplink data, and the result is forwarded to each transmitting/receiving section 203. The baseband signals output from the baseband signal processing section 204 are converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Figure 10:
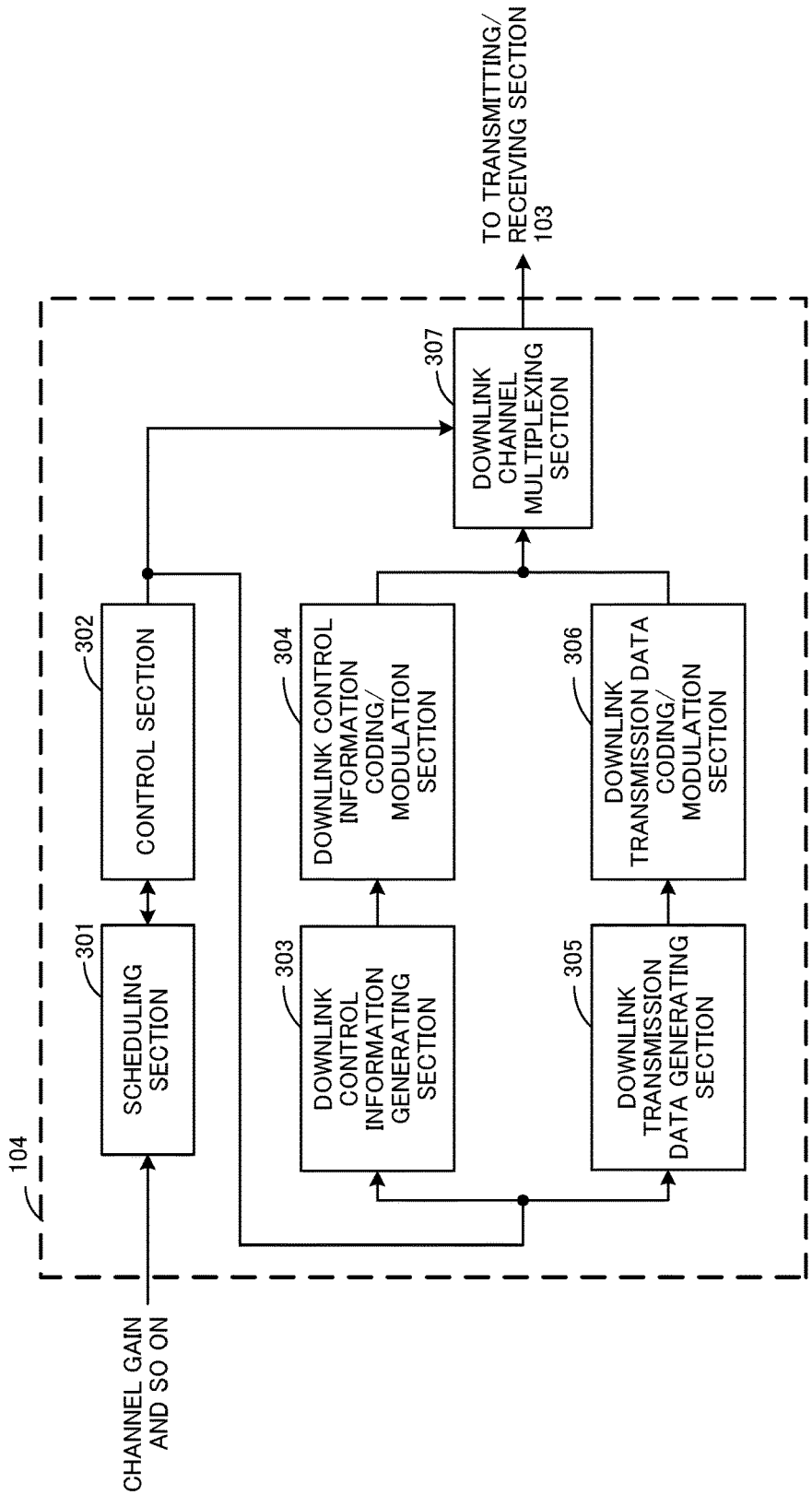
FIG. 10 is a block diagram to show an example structure of a baseband signal processing section provided in a radio base station according to the present embodiment.

FIG. 10 is a block diagram to show an example structure of a baseband signal processing section provided in a radio base stations according to the present embodiment. As shown in FIG. 10, the baseband signal processing section 104 has a scheduling section 301, a control section 302, a downlink control information generating section 303, a downlink control information coding/modulation section 304, a downlink transmission data generating section 305, a downlink transmission data coding/modulation section 306 and a downlink channel multiplexing section 307. Note that, although FIG. 10 shows only part of the structure, the baseband signal processing section 104 has required components without shortage.

The scheduling section 301 selects a combination of user terminals (user set) that are non-orthogonal-multiplexed in an arbitrary radio resource, from a plurality of candidate user sets, based on the channel gain of each user terminal 20. The scheduling section 301 may be structured, for example, to select the user set that maximizes the PF (Proportional Fairness) scheduling metric in each subband. Channel state information such as channel gains fed back from the user terminals 20 is received in the transmitting/receiving section 103 and input in the scheduling section 301.

Note that the channel gains included in the channel state information have only to represent the received quality of channels, and may be CQI, the received SINR, the SNR, the RSRP (Reference Signal Received Power), the RSSI (Received Signal Strength Indicator), the RSRQ (Reference Signal Received Quality), or may be a dynamic value or a long-term average value. Also, the channel gains do not have to be information to be fed back from the user terminals. For example, channel gains that are fed back to other radio base stations may be acquired and used, or channel gains may be determined from channel gains that are fed back from user terminals near the user terminals of interest.

Then, the scheduling section 301 selects MCSP sets based on candidate transmission power sets. To be more specific, for each user terminal 20 in the selected user set, the scheduling section 301 selects a combination of transmission powers (transmission power set), from a plurality of candidate transmission power sets. Also, the scheduling section 301 determines the modulation schemes and the coding rates (MCSs) for downlink data based on the selected transmission power sets and the channel gains. Also, the scheduling section 301 outputs a command for scheduling using the sets of the selected modulation schemes, coding rates and transmission power (MCSP set), to the control section 302. These MCSP sets may be selected per subband, or may be selected per wide band (a plurality of subbands). Note that the candidate user sets and the candidate transmission power sets are preferably stipulated in advance, or may be structured to be changed on a dynamic basis.

The control section 302 decides whether or not the MCSP sets input from the scheduling section 301 are included in MCSP sets that are stipulated in advance, and controls the scheduling section 301 based on this decision. Also, the control section 302 can decide whether or not to make the radio resource scheduling command input from the scheduling section 301 valid, based on this decision.

For example, when the decision is true (the selected MCSP sets are included in the MCSP sets that are stipulated in advance), the control section 302 can make the input scheduling command valid. In this case, the control section 302 outputs the input from the scheduling section 301 to the downlink control information generating section 303, the downlink transmission data generating section 305 and the downlink channel multiplexing section 307.

Also, when the decision is false (the selected MCSP sets are not included in the MCSP sets that are stipulated in advance), the control section 302 drops the combinations of the user sets and the transmission power sets selected in the scheduling section 301 from the combinations of candidate user sets and candidate transmission power sets from which the scheduling section 301 can select, and controls the scheduling section 301 to select MCSP sets again.

Note that, in this case, the control section 302 may as well be structured to make the input scheduling command invalid, and not output this to the downlink control information generating section 303, the downlink transmission data generating section 305 and the downlink channel multiplexing section 307.

Note that the MCSP sets that are stipulated in advance are preferably formed with a plurality of MCSP sets in which larger MCSs are associated with smaller transmission power. Also, although these pre-stipulated MCSP sets are formed with MCSP sets that indicate applying non-orthogonal multiple access (NOMA) to the user terminals 20, they may also include MCSP sets that indicate applying orthogonal multiple access (OMA).

The above structure is by no means limiting, and it is equally possible to employ a structure in which the correspondence table of pre-stipulated MCSP sets (MCSP table), the candidate user sets and the candidate transmission power sets are changed as appropriate. For example, it is possible to change these based on channel state information received from the user terminals 20. Also, it is equally possible to employ a structure in which information regarding the correspondence table of pre-stipulated MCSP sets (MCSP table), the candidate user sets and the candidate transmission power sets that are changed, is reported to the user terminals 20 through higher layer signaling (for example, RRC signaling, broadcast information, etc.), lower layer signaling (for example, downlink control information (DCI) that is included in the PDCCH) and so on.

Note that the control section 302 may also be structured to execute control so that the correspondence table of pre-stipulated MCSP sets (MCSP table) is updated, information about the updated MCSP sets (for example, the MCSP table) is reported to the user terminals 20, and, furthermore, the MCSP set selected in the scheduling section 301 are reported to the user terminals 20.

Here, the frequency to update and report the MCSP table is preferably lower than the frequency to report the MCSP sets selected in the scheduling section 301. In other words, it is preferable to structure the control section 302 to update the MCSP sets selected in the scheduling section 301 at predetermined time intervals and report these to the user terminals 20 by using lower layer signaling (DCI, etc.), and update the MCSP table at longer time intervals than the above predetermined time interval and report this to the user terminals 20 by using higher layer signaling (RRC signaling, broadcast signals and so on).

Also, regarding the reporting of MCSP sets to the user terminals 20, the control section 302 may also be structured to execute control so that information related to P (transmission power) values is reported semi-statically through higher layer signaling, information about the MCS sets selected by the scheduling section 301 is reported dynamically through lower layer signaling.

Based on scheduling commands from the control section 302, the downlink control information generating section 303 generates user terminal-specific downlink control information (DCI), which is transmitted in the PDCCH or the EPDCCH. To be more specific, the downlink control information generating section 303 generates DCI that represents the MCSP sets selected in the scheduling section 301. The downlink control information that is generated in the downlink control information generating section 303 is output to the downlink control information coding/modulation section 304.

The user terminal-specific downlink control information includes DL assignments, which are PDSCH allocation information, UL grants, which are PUSCH allocation information, and so on. Also, the downlink control information includes control information to request a CSI feedback to each user terminals 20, information that is required in the process of receiving non-orthogonal-multiplexed signals, and so on.

Also, the downlink control information generating section 303 may be structured to include information about MCSP sets selected in the scheduling section 301 (information related to combinations of modulation and coding schemes and transmission power) in the downlink control information. Furthermore, this information about selected MCSP sets is preferably joint-encoded in relationship to the user sets that are selected. The joint-encoded values may be values that are associated with the MCSP sets that are stipulated in advance. Note that this joint encoding may be carried out per subband, or may be carried out for all subbands together.

The downlink control information coding/modulation section 304 applies channel coding and modulation to the downlink control information that is input, in accordance with the MCSs selected in the scheduling section 301. The modulated downlink control information is output to the downlink channel multiplexing section 307.

The downlink transmission data generating section 305 generates downlink data on a per user terminal 20 basis, in accordance with scheduling commands that are input from the control section 302. The downlink data that is generated in the downlink transmission data generating section 305 is input in the downlink transmission data coding/modulation section 306, with higher control information, as downlink transmission data to be transmitted in the PDSCH.

The downlink transmission data coding/modulation section 306 applies channel coding and modulation to the downlink transmission data for each user terminal 20 in accordance with the MCSs selected in the scheduling section 301. The modulated downlink transmission data is output to the downlink channel multiplexing section 307. Note that the downlink control information coding/modulation section 304 and the downlink transmission data coding/modulation section 306 may be structured to employ different MCSs.

Also, the downlink transmission data generating section 305 may be structured to generate control information (higher layer control information) for higher layer signaling such as RRC layer or MAC layer signaling. The higher layer control information may include information to be controlled on a semi-static basis such as the coding rate of each wide band, the total transmission power value of each subband, the MCSP table and so on.

The downlink channel multiplexing section 307 combines the downlink control information, the downlink reference signals and the downlink transmission data (including higher control information), and generates a downlink signal. Here, the CRS, the CSI-RS, the DM-RS and so on may be used as downlink reference signals. To be more specific, in accordance with the scheduling information that is output from the scheduling section 301, the downlink channel multiplexing section 307 carries out non-orthogonal-multiplexing so that the downlink signals for a plurality of user terminals 20, selected in the scheduling section 301, are transmitted with selected transmission power. The downlink signals that are generated in the downlink channel multiplexing section 307 undergo various transmission processes and are transmitted to the user terminals 20.

Note that the scheduling information that is input in the downlink channel multiplexing section 307 may be output from the control section 302, or may be output from the scheduling section 301. When the scheduling information is output from the scheduling section 301, in accordance with the decision in the control section 302, information as to whether scheduling is valid/invalid may be output from the control section 302 to the downlink channel multiplexing section 307.

Figure 11:
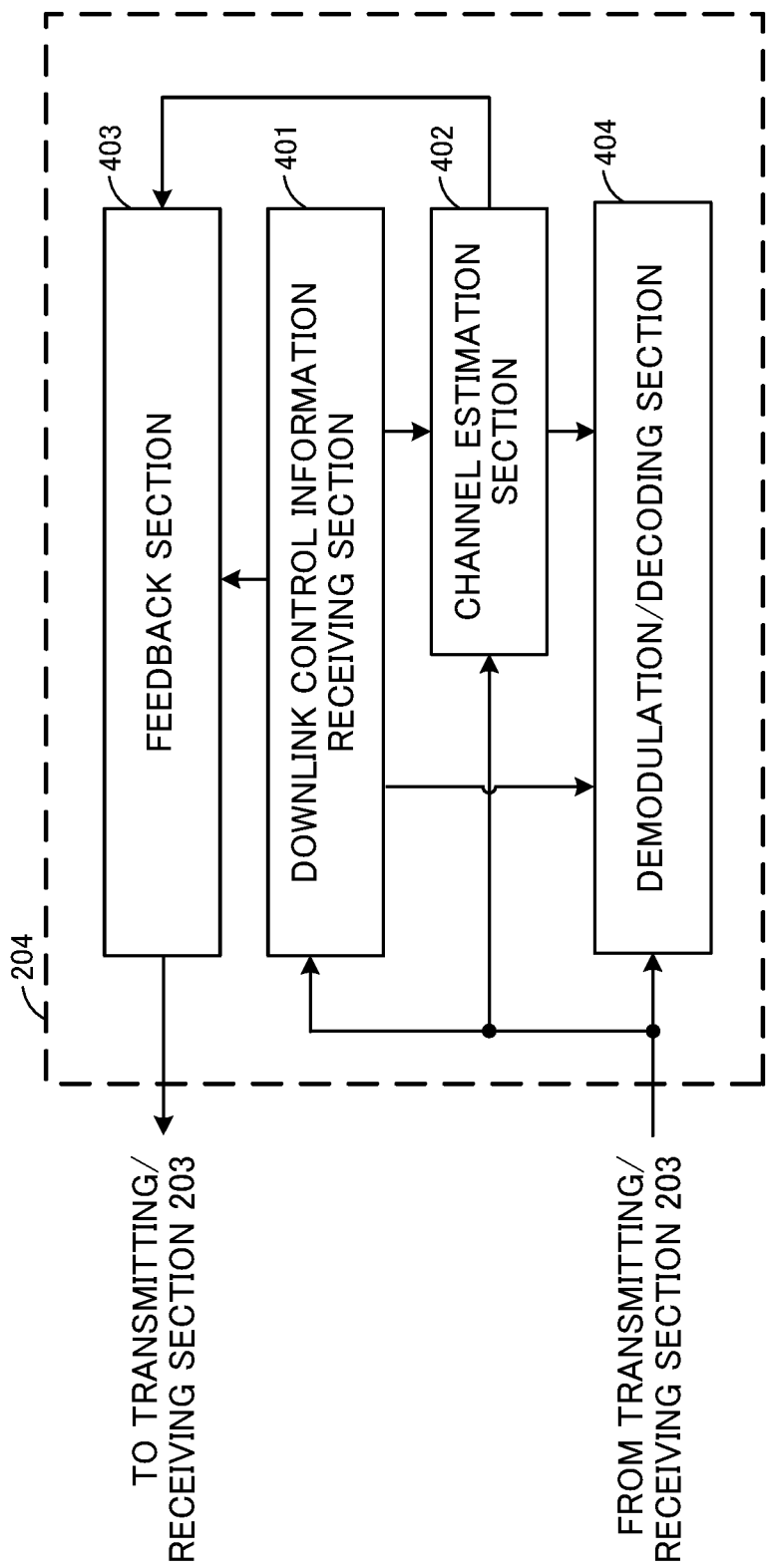
FIG. 11 is a block diagram to show an example structure of a baseband signal processing section provided in a user terminal according to the present embodiment.

FIG. 11 is a block diagram to show an example structure of a baseband signal processing section provided in a user terminal according to the present embodiment. As shown in FIG. 11, the baseband signal processing section 204 has a downlink control information receiving section 401, a channel estimation section 402, a feedback section 403 and a demodulation/decoding section 404. Note that, although FIG. 11 shows only part of the structure, the baseband signal processing section 204 has required components without shortage.

The downlink signals that are transmitted from the radio base station 10 undergo various receiving processes and are separated into the downlink control information, the downlink transmission data (including higher control information) and the downlink reference signals. The downlink control information is input in the downlink control information receiving section 401, the downlink reference signals are input in the channel estimation section 402 and the downlink transmission data is input in the demodulation/decoding section 404.

The downlink control information receiving section 401 acquires the downlink control information and outputs this to the channel estimation section 402, the feedback section 403 and the interference cancellation section 404. If information about the MCSP sets that are stipulated in advance is included in the downlink control information that is acquired, the downlink control information receiving section 401 outputs this information to the demodulation/decoding section 404.

The channel estimation section 402 performs channel estimation based on the downlink reference signals and acquires channel gains, and output the channel gains to the feedback section 403 and the demodulation/decoding section 404.

The feedback section 403 transmits channel state information, including the channel gains, to the radio base station 10. To be more specific, the feedback section 403 transmits the channel state information by using the uplink shared channel (PUSCH) or the uplink control channel (PUCCH).

The demodulation/decoding section 404 performs demodulation, decoding and interference cancellation (for example, SIC) of the downlink data signals that are received (for example, the PDSCH). To be more specific, the demodulation/decoding section 404 demodulates and decodes the downlink data based on the information that is associated with the MCSP sets that are stipulated in advance, input from the downlink control information receiving section 401.

For example, the demodulation/decoding section 404 selects an MCSP set that correspond to a value included in the DCI that is acquired (a value corresponding to a pre-stipulated MCSP set), and executes SIC-based interference cancellation based on the transmission power represented by the MCSP set and the channel gain input from the channel estimation section 402. Also, the demodulation/decoding section 404 demodulates and decodes the downlink data based on the MCS represented by the above selected MCSP set. Note that information about updated MCSP sets (for example, the MCSP table) is included in downlink data, it is possible to update the pre-stipulated MCSP sets provided in the user terminals 20 based on this piece of information.

As described above, according to the radio communication system of the present embodiment, it is possible to limit the candidate MCSP sets which the scheduler can select, so that it is possible to bring about an advantage of reducing the amount of information to report to user terminals without damaging the gain of NOMA. Also, with the radio communication system 1 of the present embodiment, whether or not an MCSP set that is selected in the scheduling section 301 is included in MCSP sets that are stipulated in advance is decided in the control section 302, and, if these MCSP sets do not match, it suffices to only drop the user set and the transmission power set that are selected, from the candidate user sets and the candidate transmission power sets, and execute scheduling again, so that it is possible to implement the radio communication system 1 of the present embodiment without making significant changes to the scheduling section 301.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. For example, it is possible to appropriately change the above-described configurations of MCSP sets. Consequently, the description herein is only provided for the purpose of illustrating examples, and should by no means be construed to limit the present invention in any way.

The disclosure of Japanese Patent Application No. 2014-006441, filed on Jan. 17, 2014, including the specification, drawings and abstract, is incorporated herein by reference in its entirety.

The invention claimed is:

1. A radio base station that superposes and transmits downlink signals to a plurality of user terminals, the radio base station comprising:

a processor that selects a user set corresponding to the plurality of user terminals from candidate user sets, and selects a combination of a modulation and coding scheme and transmission power based on transmission power sets;

the processor decides whether the selected combination of the modulation and coding scheme and transmission power is included in combinations that are stipulated in advance, and selects a user set and a combination of a modulation and coding scheme and transmission power in accordance with the decision; and a transmitter that applies the selected combination of the modulation and coding scheme and transmission power to user terminals that are included in the selected user set, and transmits the downlink signals.

2. The radio base station according to claim 1, wherein, when the decision is false, the processor drops a combination of the selected user set and the selected transmission power from combinations of the candidate user sets and the transmission power sets, and selects a user set and a combination of a modulation and coding scheme and transmission power again.

3. The radio base station according to claim 2, wherein the combinations that are stipulated in advance are formed with combinations of modulation and coding schemes and transmission power in which larger modulation and coding schemes are associated with smaller transmission power.

4. The radio base station according to claim 2, wherein:

the processor updates the combinations that are stipulated in advance; and the transmitter reports information about the updated combinations to the user terminals through higher layer signaling.

5. The radio base station according to claim 2, wherein the transmitter reports information about the combination of the selected modulation and coding scheme and transmission power to the user terminals through a downlink control channel.

6. The radio base station according to claim 2, wherein the combinations that are stipulated in advance include a combination of a modulation and coding scheme and transmission power that indicates applying orthogonal multiple access to the user terminals.

7. The radio base station according to claim 1, wherein the combinations that are stipulated in advance are formed with combinations of modulation and coding schemes and transmission power in which larger modulation and coding schemes are associated with smaller transmission power.

8. The radio base station according to claim 1, wherein:

the processor updates the combinations that are stipulated in advance; and the transmitter reports information about the updated combinations to the user terminals through higher layer signaling.

9. The radio base station according to claim 1, wherein the transmitter reports information about the selected combination of the modulation and coding scheme and transmission power to the user terminals through a downlink control channel.

10. The radio base station according to claim 1, wherein the combinations that are stipulated in advance include a combination of a modulation and coding scheme and transmission power that indicates applying orthogonal multiple access to the user terminals.

* * * * *